United States Patent [19]

Rauert et al.

[11] Patent Number: 4,830,152
[45] Date of Patent: May 16, 1989

[54] SHOCK ABSORBER PISTON

[75] Inventors: Max-Otto Rauert; Heinrich Sporenberg, both of Ennepetal; Jürgen Doench; Ewald May, both of Bonn, all of Fed. Rep. of Germany

[73] Assignee: August Bilstein GmbH & Co., Ennepetal, Fed. Rep. of Germany

[21] Appl. No.: 126,220

[22] Filed: Nov. 25, 1987

[30] Foreign Application Priority Data

Jan. 21, 1987 [DE] Fed. Rep. of Germany ....... 3701557

[51] Int. Cl.$^4$ ................................................ F16F 9/34
[52] U.S. Cl. .................. 188/322.15; 188/282
[58] Field of Search ................... 188/322.15, 312, 317, 188/280, 282

[56] References Cited

U.S. PATENT DOCUMENTS

| 3,088,556 | 5/1963 | Bourcier de Carbon | 188/322.15 |
| 3,113,644 | 12/1963 | Wossner | 188/322.15 |
| 4,121,704 | 10/1978 | Nicholls | 188/322.15 |
| 4,474,271 | 10/1984 | Molders et al. | 188/322.15 |
| 4,724,937 | 2/1988 | Fannin et al. | 188/322.15 |
| 4,733,922 | 3/1988 | Nishimura et al. | 303/113 |
| 5,624,347 | 11/1986 | Mourray | 188/322.15 |

FOREIGN PATENT DOCUMENTS

| 149489 | 7/1985 | European Pat. Off. | 188/282 |
| 1249100 | 8/1967 | Fed. Rep. of Germany | 188/322.15 |
| 969330 | 5/1988 | Fed. Rep. of Germany | |

Primary Examiner—Andres Kashnikow
Assistant Examiner—Matthew Graham
Attorney, Agent, or Firm—Herbert Dubno

[57] ABSTRACT

The invention relates to shock-absorber pistons which have a piston body mountable on a piston shaft, the piston body having on both faces a circumferential chamber and these chambers being covered by valve spring disks which rest on circumferential shoulders around the circumferential chambers. The piston body has counterflow channels each leading from the circumferential chamber on one face to an aperture outside the circumferential shoulder on the opposite face. In order especially to produce a degressive response to shock as speed increases, and for this purpose to lower the transit flow resistance of the piston body as much as possible, this body is provided with a flattened zone outside of the circumferential shoulder, and provided with transit channels covering the entire area of the body except for radial partitions between the channels, the transit channels extending from radially narrow circumferentially elongated arc shaped slots to circumferentially-short or radially broad trapezoidal openings into the circumferential chambers.

16 Claims, 6 Drawing Sheets

SHOCK ABSORBER PISTON

FIELD OF THE INVENTION

Our present invention relates to shock-absorber pistons for single-tube shock-absorbers, especially for motor vehicles, of a type having a piston body at the end of a piston shaft.

BACKGROUND OF THE INVENTION

Shock-absorber pistons are known which have a circumferential chamber on both faces of the piston body, each chamber being provided with a valve spring disk which is centrally clamped, and which rests at its periphery on a circumferential shoulder around the circumferential chamber.

Such known piston bodies moreover have two groups of counterflow fluid transit channels, each channel going from one circumferential chamber obliquely through the piston body to the opposite face of the piston body, and exiting there outside the circumferential shoulder.

Shock-absorber pistons of this type are described for example in German Pat. No. 969 330. By virtue of having circumferential chambers on both faces, the centrally-clamped valve spring disks which cover them become quite loaded hydraulically across their entire surface when the piston is moved in either direction, thus on either the push or pull stroke. This situation requires the use of rather thick valve spring disks or sets of such disks.

Moreover, it has been found desirable to minimize the disturbing noise of shock impact by having relatively small contact of the periphery of the valve spring disk with the circumferential shoulder surrounding the circumferential chamber.

In the prior art shock-absorber pistons, the hydraulic flow incident to the valve spring disks has still been unsatisfactory despite impaction by way of the associated circumferential chamber, because the transit channels leading to the circumferential chamber have generally been of narrow cross-section, which, especially in the case of high piston speeds, often results in high power requirements for the shock-absorbing action.

This problem is further intensified where the entrance apertures of the prior art shock-absorber pistons are also constricted, and where the pistons also have valve spring disks with outer flanges which move forward axially to a substantial extent.

Such valve spring disks are those which are positionable on the shaft and held by a lock nut. Such prior art shock-absorber pistons have a persistent and prevalant characteristic, which exerts an adverse effect on driving safety; in the range of higher piston speeds, on account cf the excessively strong braking of the piston motion, the ability of the vehicle wheels to adhere to the road is substantially reduced.

OBJECTS OF THE INVENTION

It is an object of the invention to provide a shock-absorber piston which cf the type mentioned, which maintains noise-free operation, which exhibits a substantially independent power-speed relationship, but which can operate degressively in the higher speed range, while not sacrificing at lower speeds the desired progressive responsivity.

It is another object to make the power/speed relationship as independent of the viscosity of the damping fluid as possible, thus making the piston relatively insensitive to high and low temperatures.

BRIEF DESCRIPTION OF THE INVENTION

The above cited objects are achieved to a high degree in the type of piston mentioned above, in accordance with the invention, by having the piston body flattened down on both faces outside of the circumferential shoulder, and by having the fluid transit channels extend over the whole surface except for relatively constricted radial partitions between the fluid transit channels, and by having the exits of these channels in the outermost region of the piston face shaped as radially-narrow circumferentially elongated slots, and by having, on the other hand, the apertures from these fluid transit channels in the circumferential chamber shaped as circumferentially shorter or radially broader trapezoids.

In this manner, a shock-absorber piston is provided whose piston body is penetrated to the greatest possible extent by the fluid transit channels, while the exits of these channels on account of the flattened edge regions can extend as much as possible around the outer circumference of the piston body. This results in the maximum cross-sectional area of flow for penetration of the damping fluid (damping oil), in both working directions.

The flow resistance of the piston channels, which hitherto has been responsible for a many-fold increase in damping energy at higher piston speeds, is reduced as much as possible. This reduced resistance, in turn, has the effect of increasing the hydraulic loading of the valve spring disks, so that design and their clamping arrangement influence the damping action more strongly.

Especially, as a result of the small transit flow resistance of the piston channels, a speed dependent damping power diagram would result which in the range of higher piston speeds would operate more or less degressively, whereby driving safety can be substantially improved.

The relatively strong hydraulic loading of the valve spring disks makes it advantageous that they be axially supported around their periphery by cup springs, these cup springs in turn being supported at their other ends by support disks attached to the piston shaft.

By appropriate dimensioning of these cup springs, and the prepressuring of them in relationship to the pressure of the valve spring disks, it is possible to achieve a wide range of damping power settings as well as to achieve a degressive response in the range of higher piston speeds.

It is known to be advantageous to have some permanent fluid penetration capability, which in the present invention may be accomplished by providing a cut into the valve spring disk which sits on the circumferential shoulder, this cut extending over the shoulder so as to constitute a bypass. In this way, a very advantageous damping power/speed relationship can be achieved, where in the range of the lowest piston speeds, a very gentle increase occurs, then at the higher piston speeds a progressive increase occurs, and at the highest speeds, a degressive characteristic is reached.

According to a further feature of the invention, the piston body can advantageously consist of two equatorially-separable identically-formed piston body halves. The inner flat surfaces which mate (are adjacent to one another) when the halves are put together are formed as spoked wheels, and between the spokes, the hub and the rim are located the fluid transit channels, which alternately are provided with the base of a channel which starts at the hub and extends outward to the arc shaped slits or are provided with oblique walls which lead to the associate circumferential chamber.

These features make possible convenient production and machining of tee piston body halves, either by mechanical machining or electroforming. It will be understood that the piston body halves can be satisfactorily made out of sintered metal, pressed, or cast, or made by other appropriate known techniques. It is also possible to make the piston body as a single piece, especially as a sintered body.

BRIEF DESCRIPTION OF THE DRAWING

The above objects, features and advantages of our invention will become more readily apparent from the following description, reference being made to the accompanying highly diagrammatic drawing in which.

SPECIFIC DESCRIPTION

Figure 1:
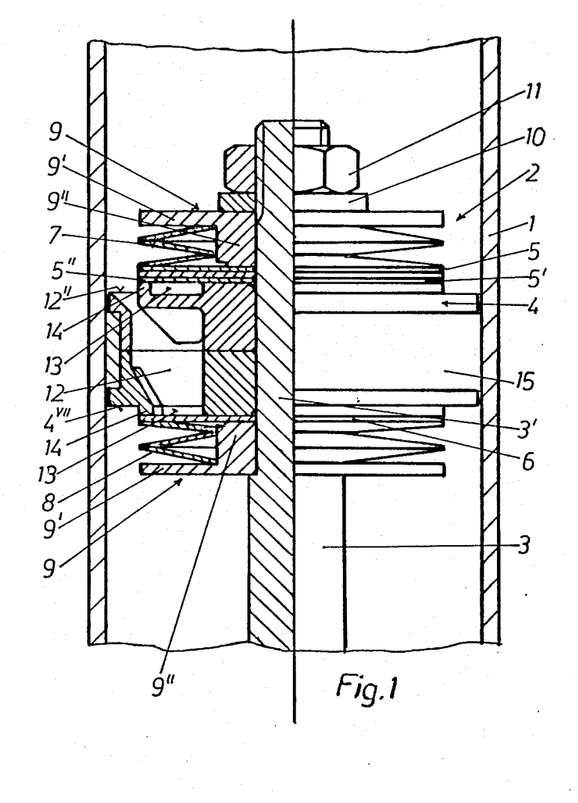
FIG. 1 shows a first embodiment of the shock-absorber piston of t he invention, shown in place in a single-tube automotive shock-absorber, partly in longitudinal cross-section.

In the automotive single-tube shock-absorber cylinder 1, which is represented in FIG. 1 partly in cross-section, this cylinder being normally filled with oil as a damping fluid, there is housed, in the usual manner, an axially-movable piston head 2.

The head 2 is attached in a usual manner to one end 3' of a piston shaft 3 which penetrates tightly through one end of the cylinder 1.

Figure 2:
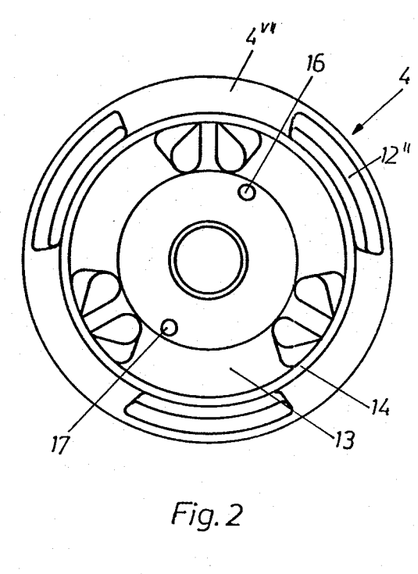
FIG. 2 and FIG. 3 show a top view of the piston of FIG. 1, and an axial cross section of the piston.
Figure 3:
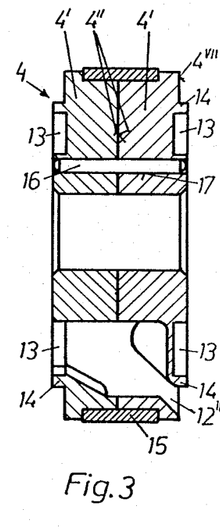
Figure 4:
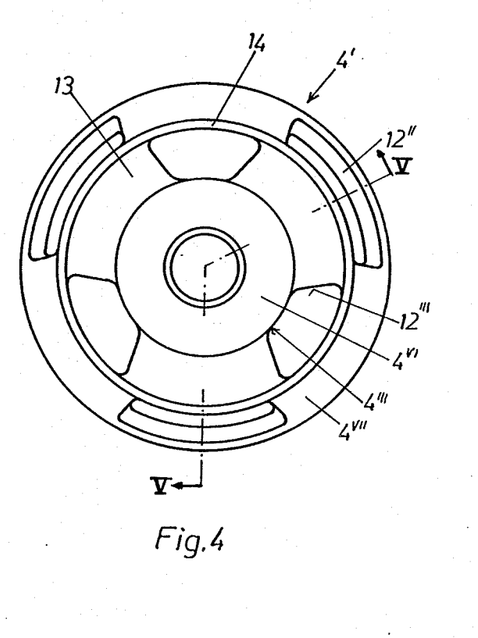
FIGS. 4, 5 and 6 show half of the aforementioned piston body in outer, cross-sectional, and inner views.
Figure 5:
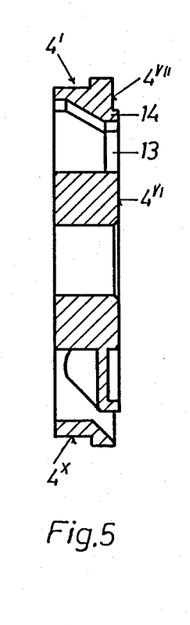

The shock-absorber piston consists essentially of the piston body 4 as shown in FIG. 2 and 3, on both sides of which are positioned valve spring disks 5 and 6 which at their cuter circumference are axially supported by cup springs 7 and 8.

Each cup spring is in turn clamped by the inward face of the flange (broad part) 9' of a T-profiled support disk 9, which with its profiled narrow part 9" sits on the inner circumference of the ring-shaped valve spring disks 5 and 6, and which provides for the central clamping thereof.

The support disk 9, the valve spring disks 5 and 6, as well as the final disk 10 are all provided with a central aperture by means of which they are mounted on the end 3' of the piston shaft, and held in place by threaded nut 11.

In the valve spring disk 5' which is bottommost in the valve spring disk stack 5 and which acts in the pulling stroke of the piston, there is at the periphery a by-pass channel 5" for continuous fluid transit.

Figure 6:
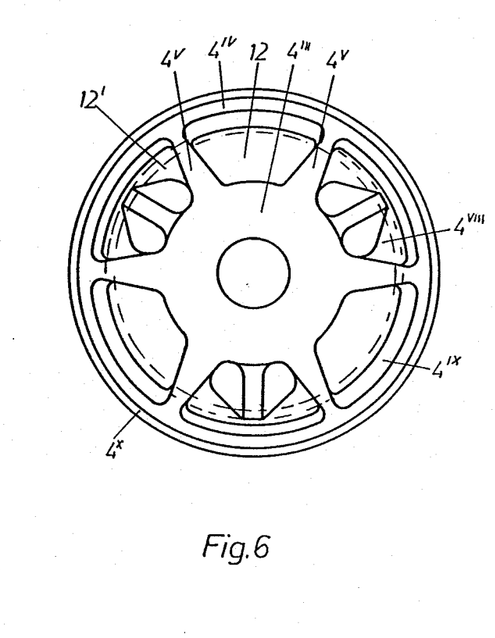
Figure 7:
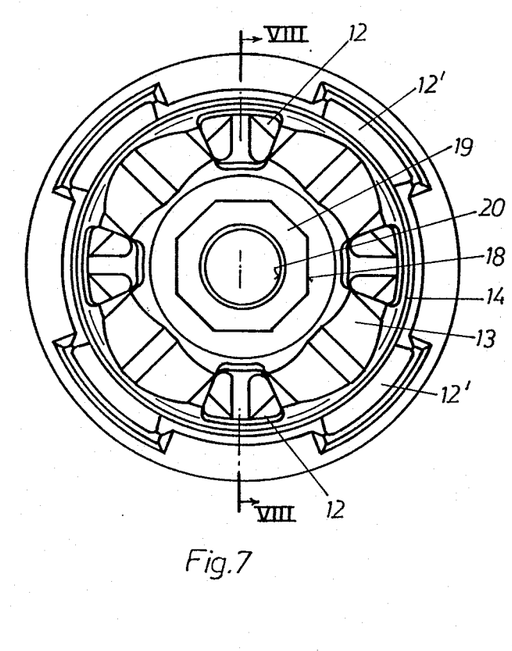
FIGS. 7 and 8 show a shock-absorber piston with four fluid transit channels for both the push and pull stages, shown in both side view and cross-section.
Figure 8:
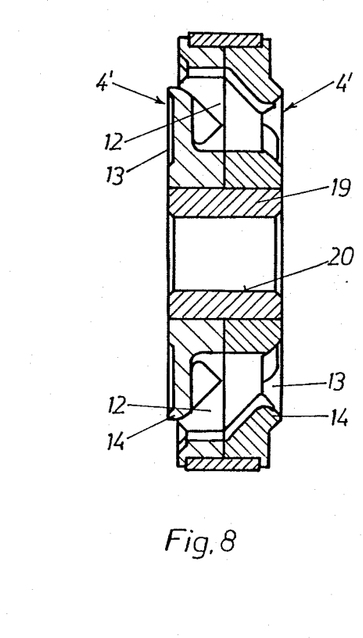
Figure 9:
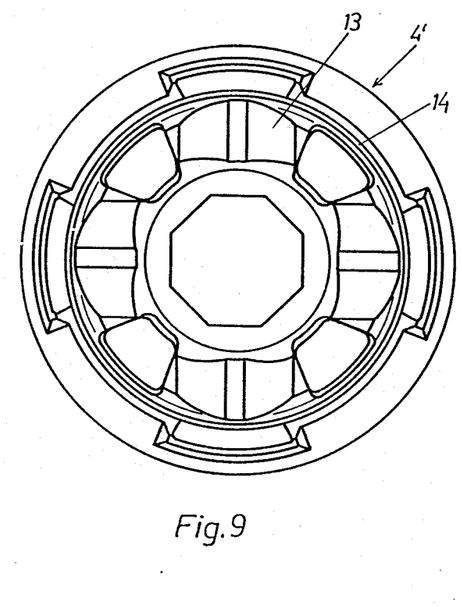
FIGS. 9, 10 and 11 show half of a shock-absorber piston with four fluid transit channels in outer, cross-sectional, and inner views.
Figure 10:
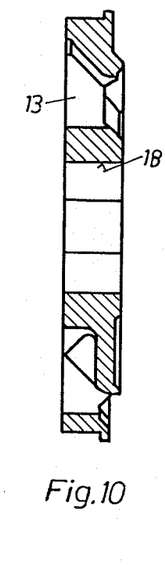

The piston body 4 consists, as shown in FIG. 2 and 3, of two equatorially-divided identically shaped piston body halves 4' which on their flat abutting inner faces 4", spokes are formed as can be seen in FIG. 6. In this manner, in the free spaces between the hub 4''', the rim $4^{IV}$ and the spokes $4^V$, there are fluid transit channels 12 and 12'. In the case depicted, there are three channels each for the pull and push piston strokes.

On its outer side, each piston body half 4' has a ring chamber 13 surrounded on its periphery by a circumferential shoulder 14 which has the same elevation as the most elevated face $4^{VI}$ of the piston body hub 4'''.

The circumferential chamber 13 is covered by its associated valve spring disk 5 or 6, which in this regard is positioned with its inner circumference on the outermost face $4^{VI}$ and its outer circumference on the circumferential shoulder 14.

The above-mentioned by-pass channel 5" on the outer periphery of the adjacent valve spring disk 5' has a cut out region deep enough so that as shown in FIG. 1 this cut out region extends over the circumferential shoulder 14 and thus forms at this point a permanent channel.

The piston body 4 as well as its both identical halves 4' are plattened down in the peripheral edge region $4^{VII}$ lying outside the circumferential shoulder 14. The fluid transit channels 12 and 12' extend over the entire extent of the piston body, with the exception of the small regions separating them, namely the spokes $4^V$, whereby their inlets in the lateral edge region $4^{VII}$ are shaped as radially narrow circumferentially-elongated arc-shaped slots 12", while their exits 12''' terminating in the circumferential chamber 13 are shaped circumferentially shorter or radially broader so as to give them essentially a trapezoidal shape.

The fluid transit channels 12 and 12' alternately start, on one hand, with the base of a channel $4^{VIII}$ which at its inner end is adjacent to the piston body hub 4''' and which extends outward to the arc shaped slots 12" or, they start with an oblique wall $4^{IX}$ which inclines inwards toward to its associated circumferential chamber 13. On their outer circumferences, the piston body halves are also provided with circumferential grooves $4^X$. Both together comprise a common circumferential groove in which for purposes of guidance and sealing of the piston, a piston ring 15 can be positioned.

Also, so that the two identically shaped piston head halves 4' can be assembled and held together in the proper position, each is provided with a locking assembly, i.e. a locking pin 16 and a locking hole 17 where the locking pin of one fits into the locking hole of the other, so as to thus facilitate assembly.

The piston bodies represented in FIGS. 7–11 similarly consist of two identically shaped halves 4', however differing from the above-described embodiment in regard to having four instead of three sets of fluid transit channels 12 and 12', alternatively one after the other, for the pulling and pushing strokes of the piston.

Figure 11:
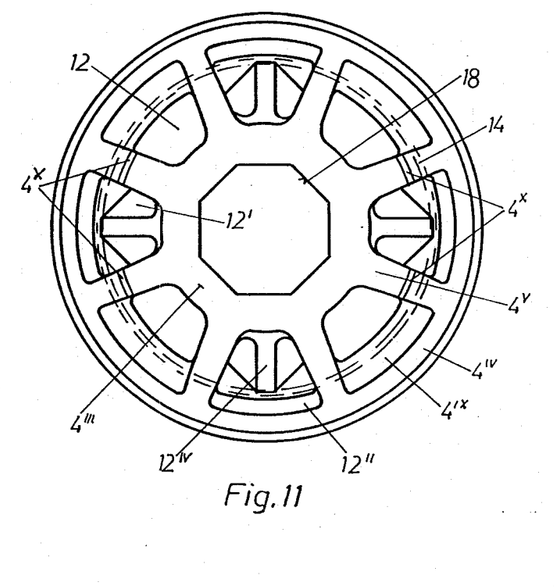

Also in these cases, both piston body halves 4', as is especially shown in FIG. 11, have their flat inner surfaces 4", which lie on one another, formed into spokes, whereby the fluid transit channels are either alternatively provided with the base of a hollowed out channel $12^{IV}$ which starts at the piston body hub 4''' and extends out to the arc shaped slot 12", or is provided with inclined walls $4^{IX}$ which incline inward and lead to the associated circumferential chamber 13.

In these cases, both piston body halves 4' are provided with multiple-sided recesses 18, having the number of sides corresponding to the number of fluid transit channels 12 and 12'; in the cases shown, it is an eight-sided recess.

Both halves 4' are bound nonrotatably with respect to one another by being fitted over a multiple-sided mounting bushing 19. This mounting bushing 19 has the same number of sides as the aperture and has a central hole 20 for the piston shaft 3'. As shown in FIG. 11, on some of the piston body spokes $4^V$ a bypass groove can be cut or formed across the spoke, thus linking two neighboring counterflowing channels 12 and 12' to one another for purposes of a fluid bypass.

Figure 12:
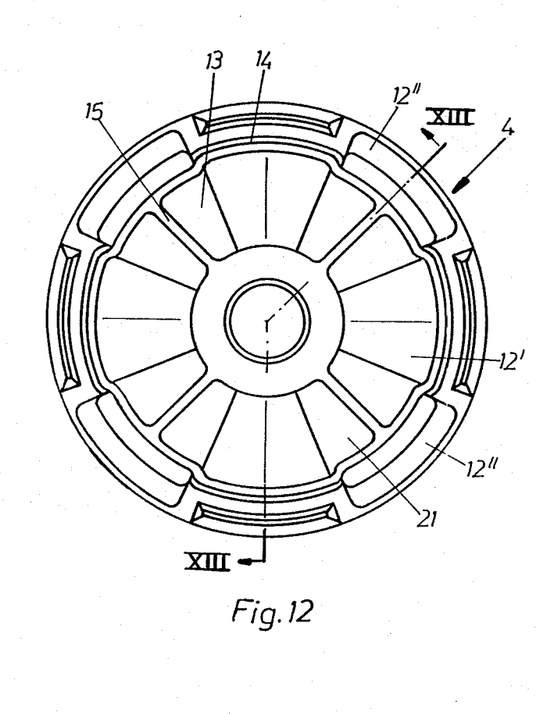
FIGS. 12, 13 and 14 show a third embodiment having a one-piece piston body in both side view and cross-section.
Figure 13:
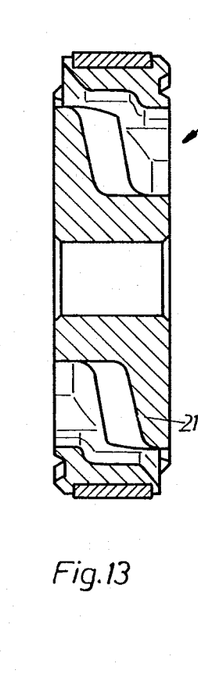
Figure 14:
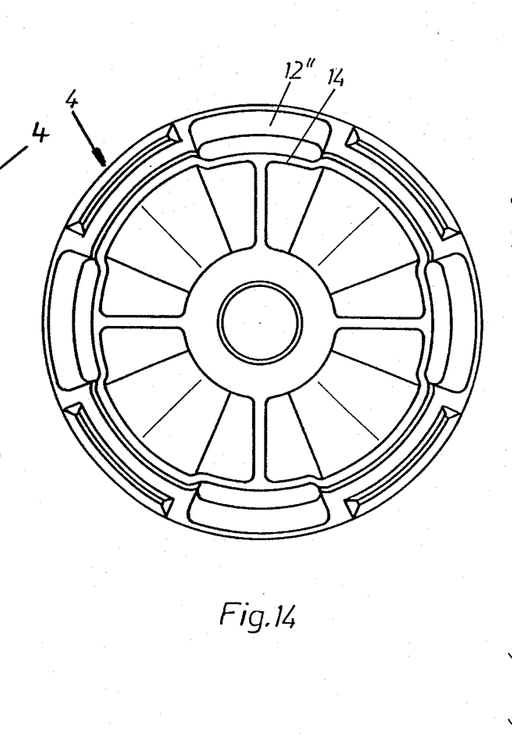

The embodiments of the invention shown in FIGS. 12 to 14 comprise a piston body made of one single sintered body. Also in this case there are for each flow direction four fluid transit channels 12 and 12', separated from one another by small radially arranged barriers, each barrier having partition walls which form channels running obliquely alternately with inward and outward slopes to the arc shaped slots 12".

In this case also, the arc shaped slots lie outside the circumferential shoulder 14, which in this case surrounds the circumferential chamber 13 which is divided by the spokes 15 into individual chamber segments 13'. It will be understood that the partitions 15 also can be depressed or flattened in form so that one circumferential chamber 13 results.

Also in this case, the apertures of the fluid transit channels 12 and 12' located outside of the circumferential shoulder 15 are shaped as radially narrow circumferentially elongated arc shaped slots, and their ends which terminate in the circumferential chamber 13 or the chamber segments 13' are of substantially trapezoidal cross-section.

Figure 15:
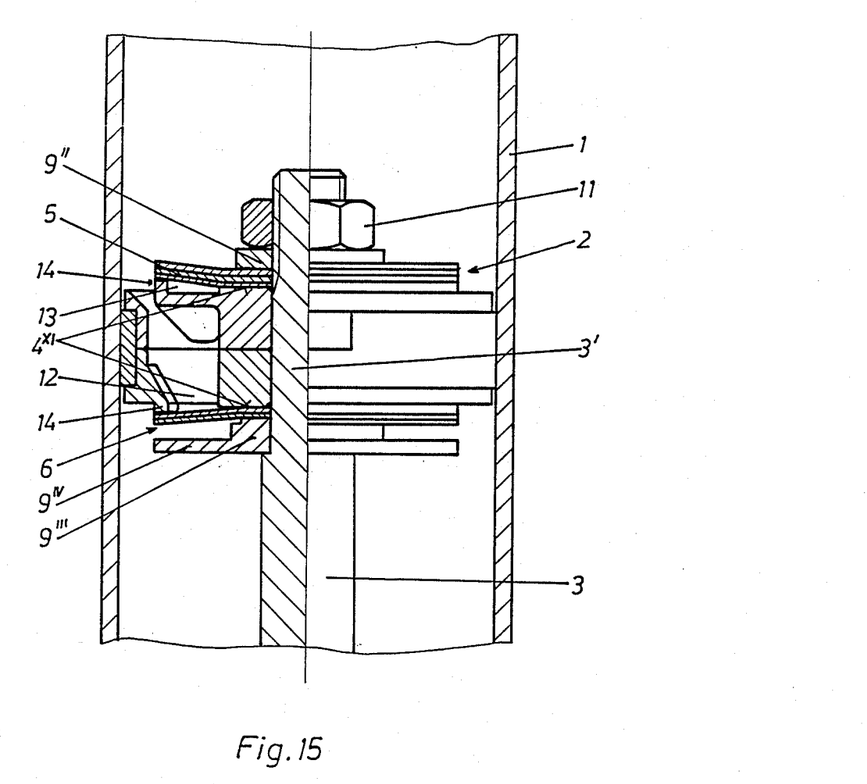
FIG. 15 shows a cross-section corresponding to FIG. 1 in which the valve spring disks are conically predeformed.

In the embodiment of the invention represented in FIG. 15, the circumferential shoulder 14 surrounding the circumferential chamber 13 protrudes in an axial direction above the central gripping surface $4^{XI}$ of both halves 4' of the piston body.

Since the valve spring disks 5 and 6 are held back at their centers by the supports 9" and 9"' which in turn are solidly attached to the piston shaft 3', and since the valve spring disks 5 and 6 are also supported at their periphery by the circumferential shoulder 15, these valve spring disks are deformed conically and thus preloaded.

By means of intermediary disks, rings etc. placed between the gripping surfaces $4^{XI}$ and the innermost valve spring disk, it is possible to control the degree of preloading. In order to protect the valve spring disks against excessive impact and excessive wear and tear, the rearwise support disk 9"' can be provided additionally with a protective flange $9^{IV}$, against which the valve spring disk can hit.

In the case of the valve spring disk 5 which is effective in the breaking step, this is not normally necessary. In some cases, the support disk 9" may be provided with a protective flange.

Within the scope of the aforedescribed invention, many variations are possible. In particular, the valve spring disks 5 and 6 can vary from their flat or slightly conical shape and can be dish-shaped, whereby the outer rim can rest on the circumferential shoulder 14 of the piston body and the inner rim can be supported on the support disk 9 or the support flange 9', so that in this case the dish-shaped spring disk directly forms a covering valve element of the circumferential channel 13.

We claim:

1. A shock-absorber piston which comprises
a piston rod;
a piston body on said rod provided with a circumferential chamber, one on each face of said piston body; and
a respective valve spring disk closing each of said chambers an outer edge of each disk being supported on a circumferential shoulder formed on said body around the respective circumferential chamber,
each of said faces of said piston body having regions which are flattened down outside of said circumferential shoulder;
said piston body being further provided with two groups of countercurrent transit channels for fluid, each of said group of channels leading from one of said circumferential chambers and obliquely penetrating said piston body to the opposite side of said piston body and opening at a position outside of the respective circumferential shoulder at the respective opposite side of said piston body,
each of said transit channels having at one end an aperture of substantially trapezoidal shape within said circumferential chamber and at the other end an aperture of elongated circumferential arc shape exiting on said regions which are flattened down outside of said circumferential shoulder,
and said transit channels being arranged over the entire area of the piston body except for relatively constricted radial partitions serving as barriers between said transit channels.

2. A shock-absorber piston as defined in claim 1 wherein respective cup strings support said valve spring disks at their outer peripheries, said piston further comprising respective support disks holding said cup springs.

3. A shock-absorber piston as defined in claim 2 wherein the said support disks have a T-shaped profile, a narrow part of each T-shaped profile bearing against the respective valve spring disk and a broad part of the respective T-shaped profile bearing against a respective cup springs.

4. A shock-absorber piston as defined in claim 1 in which at least one of the said valve spring disks bearing against a circumferential shoulder is provided with a cut out region extending past the respective shoulder and effective as a bypass.

5. A shock-absorber piston as defined in claim 1 wherein three sets of alternating transit channels are provided for push and pull strokes.

6. A shock absorber piston as defined in claim 5 wherein said piston body comprises two identical equatorially-separable halves, said halves having their mating inside surfaces formed as spoked wheels, wherein between each spoke and the hub and rim of said spoked wheels, the fluid transit channels are located, said channels being sequentially of two alternating configurations, the first of said configurations starting at the hub and extending outward to circumferential arc shaped slots and the second of said configurations starting at the rim and inclined inward with sloped walls terminating in one of said circumferential chambers.

7. A shock-absorber piston as defined in claim 6 in which both of said piston body halves have on their inner faces interlockable lock pins and lock pin sockets to prevent rotation when said halves are assembled to form said piston body.

8. A shock-absorber piston as defined in claim 6 in which both halves of said piston body are provided with an inner multisided aperture where the number of sides of said aperture corresponds to the number of said transit channels, and said halves are linked nonrotatably by an inserted bushing, said bushing having the same number of sides as said aperture and having a central shaft hole.

9. A shock-absorber piston as defined in claim 6 wherein at least one of said spokes is provided with a bypass groove from one transit channel to an adjacent transit channel.

10. A shock-absorber piston as defined in claim 1 wherein four sets of alternating transit channels are provided for the push and pull strokes.

11. A shock-absorber piston as defined in claim 10 wherein said piston body comprises two identical equatorially-separable halves, said halves having their mating inside surfaces formed as spoked wheels, wherein between each spoke and the hub and rim of said spoked wheels, the fluid transit channels are located, said channels being sequentially of two alternating configurations, the first of said configurations starting at the hub and extending outward to circumferential arc shaped slots and the second of said two configurations starting at the rim and inclined inward with sloped walls terminating in one of said circumferential chambers.

12. A shock-absorber piston as defined in claim 1 wherein said piston body is a one-piece sintered body having between said transit channels narrow separating partitions which alternately run obliquely in an outer and inner direction, to the base of arc shaped slots around the periphery of said piston body.

13. A shock-absorber piston as defined in claim 1 wherein the piston body has a circumferential groove around its periphery, said groove serving as a position for a piston ring.

14. A shock-absorber piston as defined in claim 1 in which each circumferential shoulder on which a respectively said valve spring disk rests extends out beyond a central gripping zone of said piston body, each valve spring disk being compressed axially by a support disk, so that the respective valve spring disk is conically deformed and preloaded.

15. A shock-absorber piston as defined in claim wherein the said valve spring disks are dish-shaped, the outer of said disks resting on the said circumferential shoulders, each of said valve spring disks serving as an element of said circumferential channel.

16. A shock-absorber piston as defined in claim 1 wherein said piston body comprises two identical equatorially-separable halves, said halves having their mating inside surfaces formed as spoked wheels, wherein between each spoke and the hub and rim of said spoked wheels, the fluid transit channels are located, said channels being sequentially of two alternating configurations, the first of said configurations starting at the hub and extending outward to circumferential arc shaped slots and the second of said two configurations starting at the rim and inclined inward with sloped walls terminating in one of said circumferential chambers.

* * * * *